United States Patent
Jung et al.

(10) Patent No.: US 11,057,770 B2
(45) Date of Patent: Jul. 6, 2021

(54) METHOD AND APPARATUS FOR DYNAMICALLY CHANGING CONNECTION IN WIRELESS LAN

(71) Applicant: KT Corporation, Seongnam-si (KR)

(72) Inventors: Jae Hun Jung, Seoul (KR); Hae Seok Yang, Seoul (KR); Dong Hoo Lee, Seoul (KR); Han Jin Joh, Seoul (KR)

(73) Assignee: KT Corporation, Seongnam-si (KR)

( * ) Notice: Subject to any disclaimer, the term of this patent is extended or adjusted under 35 U.S.C. 154(b) by 185 days.

(21) Appl. No.: 16/306,200

(22) PCT Filed: May 26, 2017

(86) PCT No.: PCT/KR2017/005552
§ 371 (c)(1),
(2) Date: Nov. 30, 2018

(87) PCT Pub. No.: WO2017/209463
PCT Pub. Date: Dec. 7, 2017

(65) Prior Publication Data
US 2019/0182736 A1    Jun. 13, 2019

(30) Foreign Application Priority Data

Jun. 3, 2016 (KR) .......................... 10-2016-0069333

(51) Int. Cl.
*H04W 4/00* (2018.01)
*H04W 12/08* (2021.01)
(Continued)

(52) U.S. Cl.
CPC ........... *H04W 12/08* (2013.01); *H04W 36/14* (2013.01); *H04W 48/20* (2013.01); *H04W 76/20* (2018.02);
(Continued)

(58) Field of Classification Search
CPC ..... H04W 12/08; H04W 36/14; H04W 48/20; H04W 76/20; H04W 84/12; H04W 88/06; H04W 88/10; H04W 48/14
See application file for complete search history.

(56) References Cited

U.S. PATENT DOCUMENTS

2004/0224690 A1    11/2004    Choi et al.
2005/0135236 A1    6/2005    Benson et al.
(Continued)

FOREIGN PATENT DOCUMENTS

KR    10-0580244 B1    5/2006

OTHER PUBLICATIONS

International Search Report of PCT/KR2017/005552 dated Aug. 24, 2017.

*Primary Examiner* — Abdelillah Elmejjarmi
(74) *Attorney, Agent, or Firm* — Sughrue Mion, PLLC

(57) ABSTRACT

The present invention relates to a method of dynamically changing a connection by a terminal in a wireless LAN. The method including determining a change of the connection to another wireless LAN and whether an access point (AP) of the first wireless LAN is the same as an AP of a second wireless LAN by comparing first AP identity determination information received from the first wireless LAN with second AP identity determination information received from the second wireless LAN and transmitting a message for requesting the connection to the second wireless LAN by using a temporary wireless LAN service profile generated on the basis of a wireless LAN service profile for the first wireless LAN, when the AP of the first wireless LAN is the same as the AP of the second wireless LAN.

10 Claims, 5 Drawing Sheets

(51) Int. Cl.
*H04W 84/12* (2009.01)
*H04W 76/20* (2018.01)
*H04W 88/06* (2009.01)
*H04W 48/20* (2009.01)
*H04W 88/10* (2009.01)
*H04W 36/14* (2009.01)

(52) U.S. Cl.
CPC .......... *H04W 84/12* (2013.01); *H04W 88/06* (2013.01); *H04W 88/10* (2013.01)

(56) References Cited

U.S. PATENT DOCUMENTS

| | | | |
|---|---|---|---|
| 2006/0209773 A1 | 9/2006 | Hundal et al. | |
| 2014/0010225 A1* | 1/2014 | Puregger | H04W 12/08 370/338 |
| 2014/0254349 A1 | 9/2014 | Jia et al. | |
| 2016/0073440 A1* | 3/2016 | Pallen | H04W 76/15 370/329 |
| 2016/0094515 A1 | 3/2016 | Chechani et al. | |
| 2017/0048705 A1* | 2/2017 | Fujita | H04W 12/0609 |
| 2017/0104758 A1* | 4/2017 | Jin | H04L 63/10 |

* cited by examiner

| Element ID | Length | OI | Vendor-Specific Content |
|---|---|---|---|
| 1 | 1 | j | n-j |

Octets

FIG. 4

| Element ID =Vendor Specific | Length= n | OI=Vendor OUI | OUI Type | AP Type | ...... | Command |
|---|---|---|---|---|---|---|
| 1 | 1 | 3 | 1 | 1 | | 1 |

Octets

FIG. 5

METHOD AND APPARATUS FOR DYNAMICALLY CHANGING CONNECTION IN WIRELESS LAN

TECHNICAL FIELD

The present invention relates generally to a wireless LAN system. More particularly, the present invention relate to a method, apparatus, and software for dynamically changing a connection by a terminal in a wireless LAN, and a recording medium on which the software is stored.

BACKGROUND ART

Recently, as the number of devices, such as smart phones, supporting a wireless LAN (WLAN) and consumption of high capacity content increases, user demand for improvement of quality of the wireless LAN increases. In order to improve performance of the wireless LAN, solutions, such as increasing a system bandwidth, improving peak data rate, supporting a dual band and so on, have been proposed.

When an access point (AP) provides a dual-band service (for example, a wireless LAN service in a 2.4 GHz or 5 GHz frequency band), connection is able to be changed from one frequency band to another frequency band. For example, the service in the 5 GHz frequency band is preferred because it provides higher data rate than the service in the 2.4 GHz frequency band. In the meantime, the service in the 5 GHz frequency band has smaller coverage than the service in the 2.4 GHz frequency band, and quality degradation due to an obstacle easily occurs. Therefore, according to the position of the terminal user, in some cases, the service in the 5 GHz frequency band has low quality and the service in 2.4 GHz frequency band has high quality.

In the case of ordinary terminal users, even though quality degradation on the wireless LAN service occurs while the dual-band AP is installed and the wireless LAN service in one of two frequency bands is provided, it is not possible to know a method of changing the connection to another frequency band in which higher service quality is expected. Alternatively, even though the user know the method of changing the connection to another frequency band, when the terminal does not have a history of accessing another frequency band (namely, when the terminal does not store a wireless LAN service profile for another frequency band), the terminal is unable to try connecting to another frequency band. That is, it is necessary for the user to perform manipulation such as directly inputting the wireless LAN profile for another frequency band, and so on, and then connection to another frequency band is tried.

As described above, even though the wireless LAN services in different frequency bands is possible by the dual-band AP, there is a problem that automatic connection between different frequency bands is not provided due to unskilled manipulation by the user, absence of setting of the terminal, and so on. In the case, even though the user experiences degradation of the signal quality in the currently connected frequency band, it is impossible to be connected to another frequency band in which higher quality is expected, so that there is inconvenience such as degradation of data rate, service disconnection, service delay, or the like.

DISCLOSURE

Technical Problem

The present invention is intended to propose a method and apparatus for dynamically changing a connection between multiple wireless LAN service profiles of the same AP.

It is to be understood that technical problems to be solved by the present invention are not limited to the aforementioned technical problems and other technical problems which are not mentioned will be apparent from the following description to a person with an ordinary skill in the art to which the present invention pertains.

Technical Solution

According to one aspect of the present invention, there is provided a method of dynamically changing a connection by a terminal in a wireless LAN, the method including: determining, by the terminal connected to a first wireless LAN, a change of the connection to another wireless LAN; determining whether an access point (AP) of the first wireless LAN is the same as an AP of a second wireless LAN by comparing first AP identity determination information received from the first wireless LAN with second AP identity determination information received from the second wireless LAN; and transmitting, to the second wireless LAN, a message for requesting the connection to the second wireless LAN by using a temporary wireless LAN service profile generated on the basis of a wireless LAN service profile for the first wireless LAN, when the AP of the first wireless LAN is the same as the AP of the second wireless LAN.

According to another aspect of the present invention, there is provided a method of supporting a dynamic change of a connection of a terminal by an access point (AP) in a wireless LAN, the method including: transmitting, to the terminal, first AP identity determination information for a first wireless LAN provided by the AP; transmitting, to the terminal, second AP identity determination information for a second wireless LAN provided by the AP; receiving a request for the connection from the terminal, in which a temporary wireless LAN service profile generated by the terminal on the basis of a first wireless LAN service profile for the first wireless LAN is used; and transmitting, to the terminal, a message for allowing the connection requested by the terminal, when the temporary wireless LAN service profile matches a wireless LAN service profile of the second wireless LAN.

According to still another aspect of the present invention, there is provided a terminal apparatus for performing a dynamic change of a connection in a wireless LAN, the terminal apparatus including: a transceiver; a processor; and a memory, wherein the processor is configured to: determine the change of the connection to another wireless LAN when the terminal apparatus is connected to a first wireless LAN; determine whether an access point (AP) of the first wireless LAN is the same as an AP of a second wireless LAN by comparing first AP identity determination information received from the first wireless LAN via the transceiver with second AP identity determination information received from the second wireless LAN via the transceiver; and transmit, to the second wireless LAN via the transceiver, a message for requesting the connection to the second wireless LAN by using a temporary wireless LAN service profile generated on the basis of a wireless LAN service profile for the first wireless LAN, when the AP of the first wireless LAN is the same as the AP of the second wireless LAN.

According to yet still another aspect of the present invention, there is provided an access point (AP) apparatus for supporting a dynamic change of a connection of a terminal in a wireless LAN, the access point apparatus including: a transceiver; a processor; and a memory, wherein the processor is configured to: transmit, to the terminal via the transceiver, first AP identity determination information for a first wireless LAN provided by the AP apparatus; transmit, to the terminal via the transceiver, second AP identity determination information for a second wireless LAN provided by the AP apparatus; receive a request for the connection from the terminal via the transceiver, in which a temporary wireless LAN service profile generated by the terminal on the basis of a first wireless LAN service profile for the first wireless LAN is used; and transmit, to the terminal via the transceiver, a message for allowing the connection requested by the terminal, when the temporary wireless LAN service profile matches a wireless LAN service profile of the second wireless LAN.

In the various aspects of the present invention, at least one among the first AP identity determination information and the second AP identity determination information may include at least one among organizationally unique identifier (OUI) information, OUI type information, and AP type information.

At least one among the first AP identity determination information and the second AP identity determination information may include an OUI portion of a basic service set identifier (BSSID).

At least one among the first AP identity determination information and the second AP identity determination information may be configured to be included in at least one among a beacon frame and a probe response frame.

The terminal may receive command information that indicates whether a dynamic change of the connection to the second wireless LAN is allowed.

When the command information indicates that the dynamic change of the connection to the second wireless LAN is allowed, the terminal may determine whether the AP of the first wireless LAN is the same as the AP of the second wireless LAN.

The temporary wireless LAN service profile may be stored in the terminal for a predetermined time period.

The temporary wireless LAN service profile may be generated by the terminal by using information including an encryption method and an encryption key for the first wireless LAN, which are included in the wireless LAN service profile for the first wireless LAN.

The encryption method and the encryption key for the first wireless LAN may be set to be the same as an encryption method and an encryption key for the second wireless LAN.

The first wireless LAN may operate in a first frequency band and the second wireless LAN may operate in a second frequency band.

The first wireless LAN may be identified by a first service set identifier (SSID) and the second wireless LAN may be identified by a second SSID.

It is to be understood that the foregoing summarized features are exemplary aspects of the following detailed description of the present invention without limiting the scope of the present invention.

Advantageous Effects

According to the present invention, the method and apparatus for dynamically changing a connection between multiple wireless LAN service profiles of the same AP is provided.

Effects that may be obtained from the present invention will not be limited to only the above described effects. In addition, other effects which are not described herein will become apparent to those skilled in the art from the following description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 4 is a diagram illustrating AP identity determination information according to an embodiment of the present invention.

FIG. 5 is a diagram illustrating AP identity determination information according to an additional embodiment of the present invention.

MODE FOR INVENTION

Figure 1:
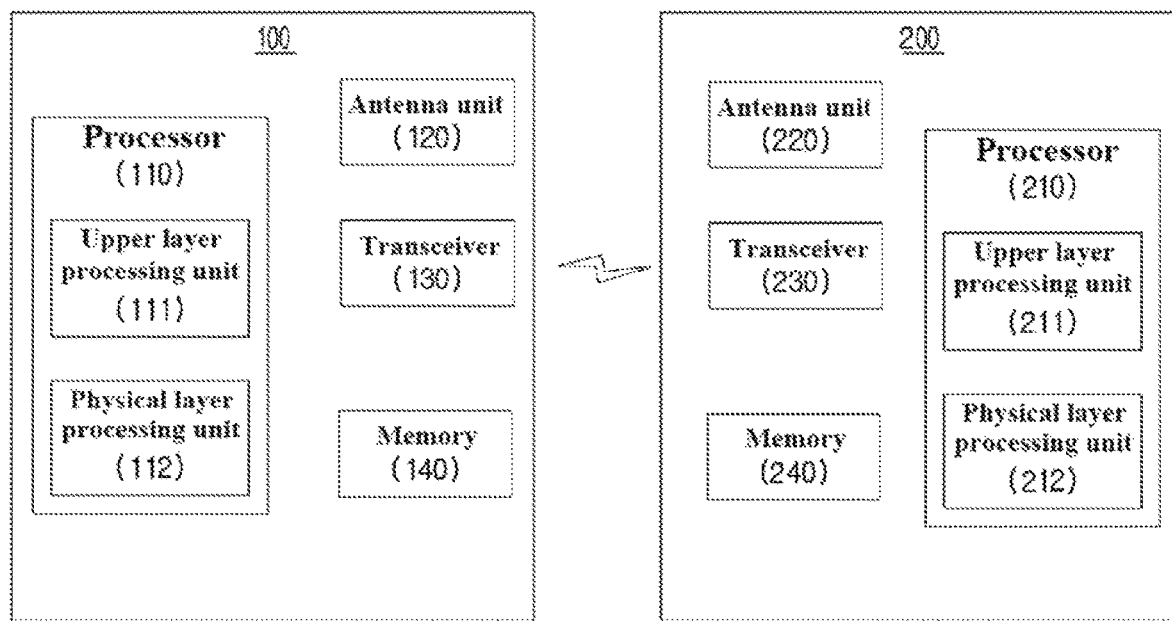
FIG. 1 is a diagram illustrating a configuration of wireless devices according to the present invention.

Hereinbelow, exemplary embodiments of the present invention will be described in detail with reference to the accompanying drawings such that the present invention can be easily embodied by those skilled in the art to which this present invention belongs. However, the present invention may be embodied in various different forms and should not be limited to the embodiments set forth herein. Further, in order to clearly explain the present disclosure, portions that are not related to the present disclosure are omitted in the drawings, and like reference numerals designate like elements throughout the specification.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

Throughout the specification, a station (STA) means an arbitrary function medium including a physical layer interface for medium access control (MAC) and a wireless medium. The stations (STAs) may be divided into a station (STA) which is an access point (AP) and a station (STA) which is a non-access point (non-AP). The station (STA) which is the access point (AP) may be referred to simply as an access point (AP), and the station (STA) which is the non-access point (non-AP) may be referred to simply as a terminal.

The access point (AP) may refer to a centralized controller, a base station (BS), a node-B, an e-node-B, a base transceiver system (BTS), a site controller, or the like, and may include partial or all functions thereof.

The terminal may refer to a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, or the like, and may include partial or all functions thereof.

Here, examples of the terminal include a communication-enabled desktop computer, a laptop computer, a tablet PC, a wireless phone, a mobile phone, a smart phone, an e-book reader, a portable multimedia player (PMP), a handheld game console, a navigation device, a digital camera, a digital multimedia broadcasting (DMB) player, a digital audio recorder, a digital audio player, a digital picture recorder, a digital picture player, a digital video recorder, a digital video player, and the like.

FIG. 1 is a diagram illustrating a configuration of a wireless device according to the present invention.

FIG. 1 illustrates a terminal apparatus 100 corresponding to an example of a downlink reception apparatus or an uplink transmission apparatus and an AP apparatus 200 corresponding to an example of a downlink transmission apparatus or an uplink reception apparatus.

The terminal apparatus 100 may include a processor 110, an antenna unit 120, a transceiver 130, and a memory 140.

The processor 110 performs baseband-related signal processing and may include an upper layer processing unit 11 and a physical layer processing unit 112. The upper layer processing unit 111 may process operation of the medium access control (MAC) layer or higher layers. The physical layer processing unit 112 may process operation of the physical (PHY) layer (for example, uplink transmission signal processing and downlink reception signal processing). In addition to performing baseband-related signal processing, the processor 110 may control overall operation of the terminal apparatus 100.

The antenna unit 120 may include one or more physical antennas, and may support MIMO transmission and reception when including multiple antennas. The transceiver 130 may include a radio frequency (RF) transmitter and an RF receiver. The memory 140 may store information processed by the processor 110, software related to operation of the terminal apparatus 100, an operating system, applications, and the like, and may include constituents, such as a buffer, and the like.

The AP apparatus 200 may include a processor 210, an antenna unit 220, a transceiver 230, and a memory 240.

The processor 210 performs baseband-related signal processing and may include an upper layer processing unit 211 and a physical layer processing unit 212. The upper layer processing unit 211 may process operation of the MAC layer or higher layers. The physical layer processing unit 212 may process operation of the PHY layer (for example, downlink transmission signal processing and uplink reception signal processing). In addition to performing baseband-related signal processing, the processor 210 may control overall operation of the AP apparatus 200.

The antenna unit 220 may include one or more physical antennas, and may support MIMO transmission and reception when including multiple antennas. The transceiver 230 may include an RF transmitter and an RF receiver. The memory 240 may store information processed by the processor 210, software related to operation of the AP apparatus 200, an operating system, applications, and the like, and may include constituents, such as a buffer, and the like.

Operation of the STA that operates in a wireless LAN system is described in terms of a layer structure. In terms of the configuration of the apparatus, the layer structure may be realized by a processor. The STA may have a multi-layer structure. For example, the layer structure covered in the 802.11 standard documents is mainly the MAC layer and the PHY layer. The PHY layer may include a physical layer convergence procedure (PLCP) entity, a physical medium dependent (PMD) entity, and the like. The MAC and PHY layers conceptually include management entities, referred to as a MAC sublayer management entity (MLME) and a physical layer management entity (PLME), respectively. These entities may provide a layer management service interface in which a layer management function operates.

In order to provide an accurate MAC operation, a station management entity (SME) may present within each STA. The SME is a layer-independent entity, and is generally in charge of function such as collecting layer-dependent states from various layer management entities (LMEs), setting values of layer-specific parameters similar, and the like.

The above-described entities interact in a variety of methods. For example, interaction takes place by exchanging primitives between the entities. The primitive means an element related to a specific purpose, a set of parameters, and a set of instructions.

Figure 2:
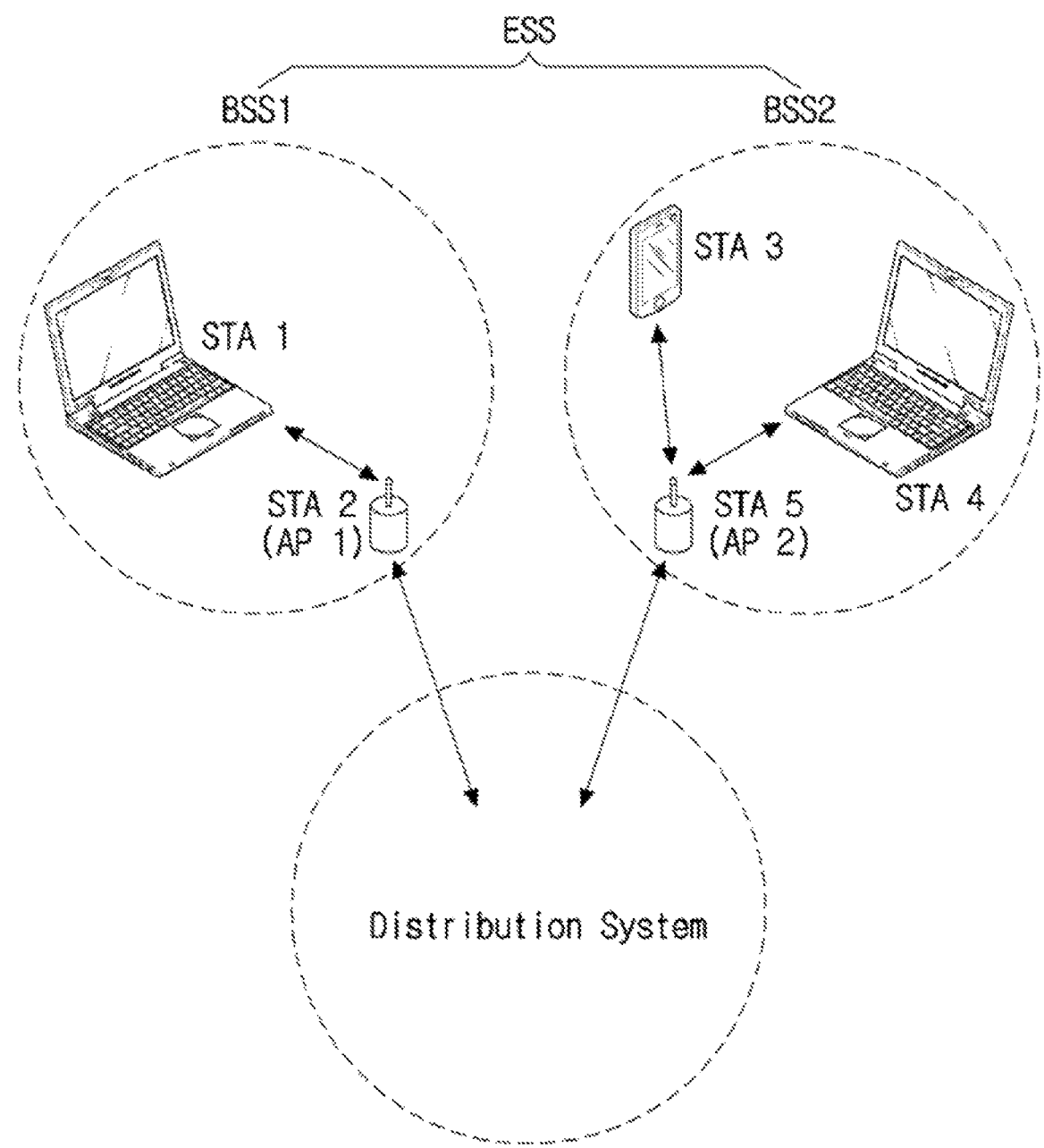
FIG. 2 is a schematic diagram illustrating an example of a configuration of a WLAN system.

FIG. 2 is a schematic diagram illustrating an example of a configuration of a WLAN system.

Referring to FIG. 2, the WLAN system includes at least one basic service set (BSS). The BSS means a set of stations (STA 1, STA 2 (AP 1), STA 3, STA 4, and STA 5 (AP 2)) capable of communicating with each other by being successfully synchronized, and is not the concept that means a specific area.

The BSSs may be divided into an infrastructure BSS and an independent BSS, and a BSS 1 and a BSS 2 correspond to infrastructure BSSs. The BSS 1 may include a terminal (STA 1), an access point (STA 2 (AP 1)) providing distribution service, and a distribution system (DS) connecting multiple access points (STA 2 (AP 1) and STA 5 (AP 2)). In the BSS 1, the access point (STA 2 (AP 1)) manages the terminal (STA 1).

The BSS 2 may include terminals (STA 3 and STA 4), an access point (STA 5 (AP 2)) providing distribution service, and a distribution system connecting multiple access points (STA 2 (AP 1) and STA 5(AP 2)). In the BSS 2, the access point (STA 5 (AP 2)) manages the terminals (STA 3 and STA 4).

In the meantime, the independent BSS is a BSS that operates in an ad-hoc mode. The independent BSS does not include the access point, so that a centralized management entity is not also present. That is, in the independent BSS, terminals are managed in a distributed manner. In the independent BSS, all the terminals may be mobile terminals. Access to the distribution system DS is not allowed, so that a self-contained network is established.

The access points (STA 2 (AP 1) and STA 5 (AP 2)) provide, for the terminals (STA 1, STA 3, and STA 4) connected thereto, access to the distribution system (DS) over the wireless medium. In the BSS 1 or BSS 2, communication between the terminals (STA 1, STA 3, and STA 4) is generally performed via the access points (STA 2 (AP 1) and STA 5 (AP 2)), but when direct links are set, direct communication between the terminals (STA 1, STA 3, and STA 4) is possible.

The multiple infrastructure BSSs may be connected to each other via the distribution system (DS). The multiple BBSs connected to each other via the distribution system (DS) are referred to as an extended service set (ESS). The stations included in the ESS are capable of communicating with each other, and the terminal may move from one BSS to another BSS within the same ESS with seamless communication.

The distribution system (DS) is a mechanism for communication between one access point and another access point. According to this, the access point may transmit frames for the terminals connected to the BSS that is managed by the access point, or may transmit frames for an arbitrary terminal moved to another BSS. Also, the access point may transmit or receive frames from an external network, such as a wired network, or the like. This distribution system (DS) is unnecessarily a network, and there is no limitation to the form. For example, the distribution system may be a wireless network, such as a mesh network, or may be a physical structure connecting access points to each other.

In the present invention, the operation of the AP and STA in the infrastructure BSS network structure is described as a main embodiment, but the embodiments of the present invention are also applied to operation of a device corresponding to a group owner and a device corresponding to a group client, as in a Wi-Fi direct system.

Figure 3:
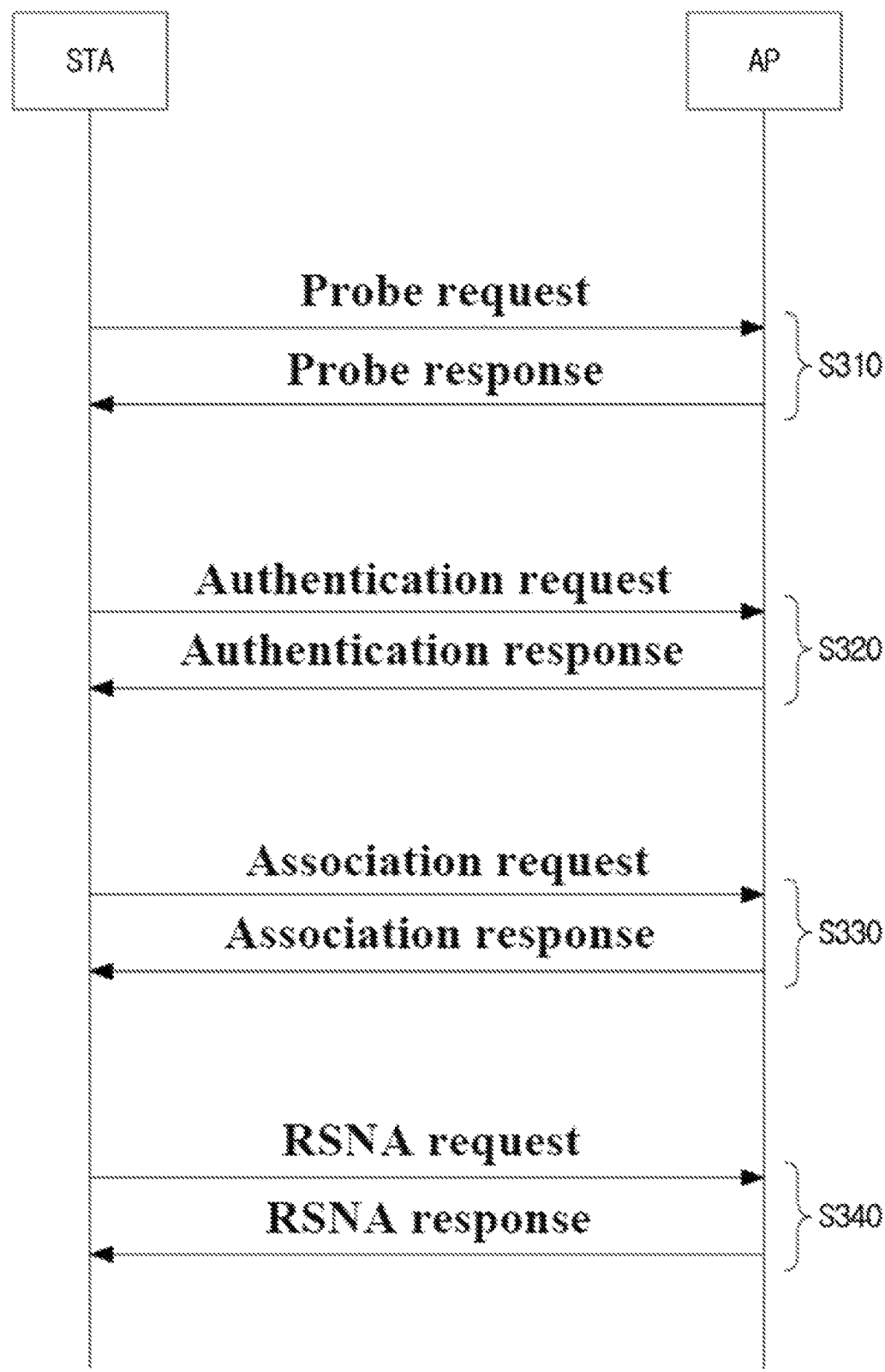
FIG. 3 is a diagram illustrating a link setup process in a wireless LAN.

FIG. 3 is a diagram illustrating a link setup process in a wireless LAN.

In order for the STA to setup a link for the network and to transmit and receive data, first, the network is discovered, authentication is performed, association is established, an authentication procedure for security, and so on are required to take place. The link setup process is also referred to as a session start process or session setup process. Also, the discovery, authentication, association, security setting in the link setup process are collectively referred to as an association process.

At step S310, the STA may perform a network discovery operation. The network discovery operation may include a scanning operation of the STA. That is, in order for the STA to access the network, it is necessary to find a network in which participation is possible. The STA is required to identify a compatible network before participating in the wireless network. The process of identifying the network which is present in a specific area is referred to as scanning.

Scanning methods include active scanning and passive scanning.

FIG. 3 illustrates, as an example, a network discovery operation including an active scanning process. Regarding active scanning, the STA performing scanning transmits a probe request frame to discover what AP is present nearby while shifting between the channels, and waits for the response thereto. A responder transmits a probe response frame to STA that transmits the probe request frame in response to the probe request frame. Here, the responder may be the STA that transmits a beacon frame last in the BSS of the channel being scanned. In the BSS, since the AP transmits the beacon frame, the AP is the responder. In the independent BSS, since the STAs within the independent BSS alternately transmit the beacon frames, the responder varies. For example, the STA that transmits the probe request frame on a first channel and receives the probe response frame on the first channel may store BSS-related information contained in the received probe response frame and shifts to a subsequent channel (for example, a second channel) to perform scanning (namely, probe request/response transmission and reception on the second channel) with the same method.

Although not illustrated in FIG. 3, the scanning operation may be performed in the passive scanning method. In the passive scanning, the STA performing scanning waits for the beacon frame while shifting between the channels. The beacon frame is one of the management frames defined in the IEEE 802.11 standard, informs that the wireless network is present, and is periodically transmitted in such a manner as to enable the STA performing scanning to find the wireless network for participation in the wireless network. In the BSS, the AP periodically transmits the beacon frame, and in the independent BSS, the STAs within the independent BSS alternatively transmit the beacon frames. When receiving the beacon frame, the STA performing scanning stores information on the BSS, which is contained in the beacon frame, and records information on the beacon frame on each channel by shifting to other channels. The STA receiving the beacon frame stores the BSS-related information contained in the received beacon frame and after shifting to a subsequent channel performs scanning on the subsequent channel with the same method.

After the STA discovers the network, the authentication process is performed at step S320. This authentication process is referred to as a first authentication process in order to be clearly distinguished from a security setup operation at step S340.

The authentication process includes a process of transmitting an authentication request frame by the STA to the AP and in response thereto, of transmitting an authentication response frame by the AP to the STA. An authentication frame used in authentication request/response corresponds to the management frame.

The authentication frame may contain an authentication algorithm number, an authentication transaction sequence number, a status code, a challenge text, and information on a robust security network (RSN), a finite cyclic group, and the like. This corresponds to some examples of information that may be contained in the authentication request/response frame, and may be replaced by another type of information, or may further contain additional information.

The STA may transmit the authentication request frame to the AP. The AP may determine, on the basis of the information contained in the received authentication request frame, whether to allow authentication for the STA. The AP may provide the result of the authentication process via the authentication response frame to the STA.

After the STA is successfully authenticated, the association process is performed at step S330. The association process includes a process of transmitting an association request frame by the STA to the AP and in response thereto, of transmitting an association response frame by the AP to the STA.

For example, the association request frame may contain information on various capabilities, a beacon listen interval, an service set identifier (SSID), supported rates, supported channels, RSN, a mobility domain, supported operating classes, traffic indication map (TIM) broadcast request, interworking service capability, and the like.

For example, the association response frame may contain information on various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, TIM broadcast response, a quality of service (QoS) map, and the like.

This corresponds to some examples of information that may be contained in the association request/response frame, and may be replaced by another type of information, or may further contain additional information.

After the STA is successfully associated with the network, the security setup process is performed at step S340. The security setup process at step S340 may be referred to as an authentication process through robust security network association (RSNA) request/response. Alternatively, the authentication process at step S320 may be referred to as a first authentication, and the security setup process at step S340 may be referred to simply as an authentication process.

The security setup process at step S340 may include, for example, a private key setup process through 4-way handshaking via an extensible authentication protocol over LAN (EAPOL) frame. Also, the security setup process may be performed according to various security procedures that are not defined in the IEEE 802.11 standard.

Hereinafter, an automatic connection method of the terminal for multiple wireless LAN service profiles (WLAN service profiles) of the same AP according to the embodiments of the present invention will be described.

For example, the same AP includes a case of the same MAC address corresponding to the BSS identifier (BSSID), or a case of the same portion (for example, an organization identifier (OI)) of the MAC address.

Also, the multiple wireless LAN service profiles may correspond to multiple frequency bands or multiple SSIDs. Here, the wireless LAN service profile means a set of information including a wireless LAN name (for example, the SSID), an encryption method (for example, Wi-Fi Protected Access-pre-shared key (WPA-PSK), WPA2-PSK, EAP-1x, and the like), an encryption key, roaming information, and the like.

The automatic connection method described through the embodiments of the present invention is a method that even though the terminal which operates in a first wireless LAN according to a first wireless LAN service profile does not store a second wireless LAN service profile (for example, even though the terminal does not have a history of accessing a wireless LAN corresponding to the second wireless LAN service profile), an automatic or dynamic connection to the second wireless LAN according to the second wireless LAN service profile takes place. Here, first and second wireless LANs are wireless LANs provided by the same AP. Also, an operation that the terminal connected to the first wireless LAN changes the connection to the second wireless LAN may be triggered, when quality of the service from the first wireless LAN is degraded due to obstacles, nearby interference, and the like (for example, when the signal strength is weakened). Accordingly, without intervention or manipulation of the user and without disconnection of the wireless LAN service, wireless LAN connection is dynamically changed.

In the present invention, for convenience of description, the case where the same AP is a dual-band AP that supports operation in both 2.4 GHz and 5 GHz frequency bands is described as the embodiment, but the scope of the present invention is not limited thereto. For the case where the same AP supports operation in other frequency bands rather than 2.4 GHz or 5 GHz or supports more than two frequency bands, the embodiments of the present invention are also applied.

For example, in the same AP, the SSID of the first wireless LAN service profile provided in the 5 GHz frequency band may be olleh_GiGA_WiFi_xxxx, and the SSID of the second wireless LAN service profile provided in the 2.4 GHz frequency band may be olleh_WiFi_xxxx. Since the wireless LAN service in the 5 GHz frequency band provide higher data rate, the user terminal stores the 5 GHz wireless LAN service profile and connects to the first wireless LAN service in the 5 GHz frequency band. According to a conventional method, in the case where the 2.4 GHz wireless LAN service profile is not stored in the terminal, unless the user performs manipulation of directly inputting the 2.4 GHz wireless LAN service profile, the terminal is unable to try automatically changing the connection to the 2.4 GHz frequency band even though the signal quality is degraded in the 5 GHz frequency band. However, a method of dynamically or automatically changing the connection to different wireless LAN service profiles (wireless LAN service profiles at least having different SSIDs) of the same AP has not proposed yet. Hereinafter, the various embodiments of the present invention for the method of dynamically or automatically changing the connection with respect to different wireless LAN service profiles of the same AP will be described.

According to the present invention, through the message periodically transmitted by the AP to the terminal or the message transmitted by the terminal's request, information on the wireless LAN which the terminal does not have a history of accessing (or which the terminal does not store the wireless LAN service profile) is provided. For example, it is assumed the case in which the AP provides the wireless LAN service in the first and second frequency bands, and the first wireless LAN service profile for the first frequency band is stored in the terminal, but the second wireless LAN service profile for the second frequency band is not stored in the terminal. In this case, even in a state of the terminal not connected to the second frequency band of the AP, the terminal is able to receive information on the wireless LAN service in the second frequency band, which is provided by the AP via the management frame (for example, the beacon frame broadcast for all terminals within the wireless LAN, or the probe response frame subjected to unicast to a specific terminal within the wireless LAN).

Here, through the information contained in the management frame transmitted in the second frequency band, the terminal may determine whether the AP providing the wireless LAN service in the second frequency band is the same as the AP providing the wireless LAN service in the first frequency band to which the terminal is currently connected. Information contained in the management frame is referred to as AP identity determination information, and the detailed content thereof will be described in detail with reference to FIG. 4.

FIG. 4 is a diagram illustrating AP identity determination information according to an embodiment of the present invention.

FIG. 4 illustrates, as an example of the AP identity determination information, a format of a vendor-specific element included in the management frame such as the beacon frame, the probe response frame, or the like. The vendor-specific element is defined in the IEEE 802.11 standard document and is used to carry information that is not defined in the standard document.

An element ID field may be one octet in size and may be set to a value (for example, 0xdd) indicating that the element corresponds to a vendor-specific element.

A length field may be one octet in size and may be set to a value indicating the size of fields subsequent to the length field.

An organization identifier (OI) field may be j octet in size and may be set to a value that identifies an entity (namely, vendor) which defines the content of a particular vendor-specific element. Here, when the OI field is defined as an organizationally unique identifier (OUI) value, j=3 is possible. When the OI field is defined to represent an identifier greater than three octets, the first three octets of the OI field correspond to the OUI. Therefore, the OI field contains the OUI value of at least three octets in size.

A vendor-specific content field may be n-j (here, j≤n≤255) octets in size and may contain various types of information and additional information defined in the present invention.

The terminal may use the OUI (or OI) value as the AP identity determination information. For example, as the wireless LAN service profile for the first frequency band identified by a first SSID, a first OUI value contained in the management frame such as the beacon or probe response received in the first frequency band may be stored. Although the first wireless LAN service profile for the first frequency band identified by the first SSID is stored, the terminal, which does not store the second wireless LAN service profile for the second frequency band identified by the second SSID (namely, which does not have a history of accessing the second frequency band), is able to check a second OUI value contained in the management frame such as the beacon or prove response received in the second frequency band while being connected to the first frequency band. When the first OUI value is the same as the second OUI value, the terminal determines that the AP providing the wireless LAN service in the first frequency band is the same as the AP providing the wireless LAN service in the second frequency band (namely, the AP providing a service set identified by the first SSID is the same as the AP providing a service set identified by the second SSID).

Accordingly, although the terminal does not store the second wireless LAN service profile, the terminal is able to generate and store a temporary wireless LAN service profile using an encryption method, an encryption key, and the like stored in the first wireless LAN service profile. Here, the temporary wireless LAN service profile may be stored as a temporary wireless LAN service profile for the wireless LAN that is identified by the second SSID or is provided in the second frequency band. Also, the temporary wireless LAN service profile is not a wireless LAN service profile input by the user, so that it is distinguished from the wireless LAN service profile input by the user. Also, the temporary wireless LAN service profile may be stored only for a predetermined time period (for example, until the time when a change of the connection to the second wireless LAN is tried and the success or failure of the change of the connection is determined) or until a delete command is issued by the user.

When the quality of the wireless LAN service in the first frequency band is degraded, the terminal is able to try automatically or dynamically connecting to the wireless LAN in the second frequency band using the generated temporary wireless LAN service profile.

Here, one AP providing the wireless LAN services in the first frequency band and the second frequency band may set the encryption method and the encryption key for accessing the wireless LAN in the first frequency band and the second frequency band equally. That is, the AP may be set in such a manner as to access the wireless LAN in the second frequency band using the encryption method and the encryption key that are used to access the wireless LAN in the first frequency band.

As an additional example, the OI or OUT, and additional information may be used as the AP identity determination information. This will be described in detail with reference to FIG. 5.

FIG. 5 is a diagram illustrating AP identity determination information according to an additional embodiment of the present invention.

The example in FIG. 5 may correspond to the detailed formation of the vendor-specific element in FIG. 4.

For example, the element ID field may be set to a value of 0xdd indicating that the element is the vendor-specific element.

The length field may be set to a value indicating the length n of the subsequent fields.

The OI field may be set to the OUI value of three octets indicating a specific vendor. For example, when the value of the OUI field is set to 0x00 0x17 0xC3, the vendor named KtfTechn is identified.

The vendor-specific content field in FIG. 4 may include at least one among an OUI type subfield, an AP type subfield, and a command subfield, as the example in FIG. 5.

The OUI type subfield may be one octet in size and may indicate one among various types of information used in a particular OUI value. For example, the OUI type may have one of the values from 0x00 to 0xff.

Here, OUI type information may be utilized as the AP identity determination information. For example, the OUI type information may be utilized alone or in combination with the OUI information as the AP identity determination information.

For example, when the first OUI value and a first OUI type value of the vendor-specific field that is contained in the management frame which is received on the wireless LAN in the first frequency band identified by the first SSID are the same as the second OUI value and a second OUI type value of the vendor-specific field that is contained in the management frame which is received on the wireless LAN in the second frequency band identified by the second SSID, the terminal determines that the AP providing the wireless LAN service in the first frequency band is the same as the AP providing the wireless LAN service in the second frequency band (namely, the AP providing the service set identified by the first SSID is the same as the AP providing the service set identified by the second SSID). Accordingly, even through the terminal does not store the second wireless LAN service profile, the terminal is able to generate and store the temporary wireless LAN service profile using the encryption method, the encryption key, and the like stored in the first wireless LAN service profile.

An AP type field may be one octet in size and may be set to a value indicating types of various APs. For example, when the values of the AP types are 0x00, 0x01, 0x02, . . . , it indicates that the AP types are a home AP, a zone AP, WiBro Egg AP, . . . , respectively.

Here, AP type information may be utilized as the AP identity determination information. For example, the AP type information may be utilized alone, in combination with the OUI information, in combination with the OUI type information, or in combination with the OUI information and the OUI type information as the AP identity determination information.

For example, when the first OUI value, the first OUI type value, and a first AP type value of the vendor-specific field that is contained in the management frame which is received on the wireless LAN in the first frequency band identified by the first SSID are the same as the second OUI value, the second OUI type value, and a second AP type value of the vendor-specific field that is contained in the management frame which is received on the wireless LAN in the second frequency band identified by the second SSID, the terminal determines that the AP providing the wireless LAN service in the first frequency band is the same as the AP providing the wireless LAN service in the second frequency band (namely, the AP providing the service set identified by the first SSID is the same as the AP providing the service set identified by the second SSID). Accordingly, even through the terminal does not store the second wireless LAN service profile, the terminal is able to generate and store the temporary wireless LAN service profile using the encryption method, the encryption key, and the like stored in the first wireless LAN service profile.

As described above, when the vendor-specific field that is contained in the management frame which is received on the wireless LAN in the first frequency band identified by the first SSID and the vendor-specific field that is contained in the management frame which is received on the wireless LAN in the second frequency band identified by the second SSID have at least one among the same OUI value, the same OUI type value, and the same AP type value, the terminal determines that AP providing the wireless LAN service in the first frequency band is the same as the AP providing the wireless LAN service in the second frequency band (namely, the AP providing the service set identified by the first SSID is the same as the AP providing the service set identified by the second SSID). Accordingly, even through the terminal does not store the second wireless LAN service profile, the terminal is able to generate and store the temporary wireless LAN service profile using the encryption method, the encryption key, and the like stored in the first wireless LAN service profile.

In the meantime, in the example in FIG. 5, the vendor-specific content field may further include a command field.

The command field may be one octet in size and may indicate whether to apply an operation of dynamically changing the connection between multiple wireless LAN service profiles (or multiple frequency bands, or multiple SSIDs) of the same AP proposed in the embodiments of the present invention. For example, when the value of the command field indicates a first value (or ON value), it indicates that the operation of dynamically changing the connection according to the embodiments of the present invention is allowed. In the meantime, when the value of the command field indicates a second value (or OFF value), it indicates that the operation of dynamically changing the connection according to the embodiments of the present invention is not allowed.

Accordingly, when the vendor-specific field that is contained in the management frame which is received on the wireless LAN in the first frequency band identified by the first SSID and the vendor-specific field that is contained in the management frame which is received on the wireless LAN in the second frequency band identified by the second SSID have at least one among the same OUI value, the same OUI type value, and the same AP type value, the terminal determines that the AP providing the wireless LAN service in the first frequency band is the same as the AP providing the wireless LAN service in the second frequency band (namely, the AP providing the service set identified by the first SSID is the same as the AP providing the service set identified by the second SSID). Here, when the command value of the vendor-specific field that is contained in the management frame which is received on the wireless LAN in the second frequency band identified by the second SSID indicates the ON value, even though the terminal does not store the second wireless LAN service profile, the terminal is able to generate and store the temporary wireless LAN service profile using the encryption method, the encryption key, and the like that are stored in the first wireless LAN service profile. When the command value of the vendor-specific field that is contained in the management frame which is received on the wireless LAN in the second frequency band identified by the second SSID indicates the OFF value, the temporary profile for the wireless LAN in the second frequency band identified by the second SSID is not generated or stored.

As described above, in the embodiments of the present invention, it is described that the AP identity determination information (for example, at least one among the OUI, the OUI type, and the AP type) and the command information are included in the vendor-specific element of the management frame, but the scope of the present invention is not limited thereto. The AP identity determination information and the command information may be included in another element of another type of frame (for example, a control frame, a data frame, and a generic advertisement service (GAS) frame) that the AP provides to the terminal.

For example, the terminal may check the BSSID of the AP via an address field, which is contained in the frame received from the AP, and the like. The BSSID may be six octets in size and may be configured with the MAC address assigned by the manufacturer of a network interface controller (NIC) of the AP. Here, among the six octets of the BSSID, the most significant (MS) three octets may be configured as the OUI. In the OUI of the BSSID, when the value of a particular bit (for example, the second bit (b2) of the MS one octet) is zero, the OUI functions as global unique identifier. When the value of the particular bit is one, the OUI functions as an identifier assigned by a local manager.

According to the embodiment of the present invention, the above-described OUI portion of the MAC address of the BSSID may be utilized as the AP identity determination information. That is, in the state where the terminal stores only the first wireless LAN service profile in the first frequency band, when the OUI of the BSSID of the frame that is received in the second frequency band is the same as the OUI of the BSSID that is received in the first frequency band, it is able to generate and store the temporary wireless LAN service profile on the basis of the first wireless LAN service profile and to try dynamically connecting to the wireless LAN in the second frequency band.

For example, it is assumed the case in which the first SSID on the wireless LAN in the first frequency band is ABC xxxx and the OUI portion of the BSSID of the frame that the terminal receives from the AP in the first frequency band is 02:12:34. In the meantime, the second SSID on the wireless LAN in the second frequency band may be ABC_5 GHz_xxxx, and the OUI portion of the BSSID of the frame that the terminal receives from the AP in the second frequency band may be 02:12:34. As described above, when the OUI portions of the BSSIDs are the same, the terminal determines that the AP on the wireless LAN in the first frequency band identified by the first SSID is the same as the AP on the wireless LAN in the second frequency band identified by the second SSID.

Alternatively, it is assumed the case in which the first SSID on the wireless LAN in the first frequency band is ABC xxxx and the OUI portion of the BSSID of the frame that the terminal receives from the AP in the first frequency band is 00:12:34. In the meantime, the second SSID on the wireless LAN in the second frequency band may be ABC_5 GHz_xxxx, and the OUI portion of the BSSID of the frame that the terminal receives from the AP in the second frequency band may be 02:12:34. As described above, the portions in the OUI except for the first two octets (00 for the first SSID and 02 for the second SSID) are 12:34 equally, the terminal determines that the AP on the wireless LAN in the first frequency band identified by the first SSID is the same as the AP on the wireless LAN in the second frequency band identified by the second SSID.

Figure 6:
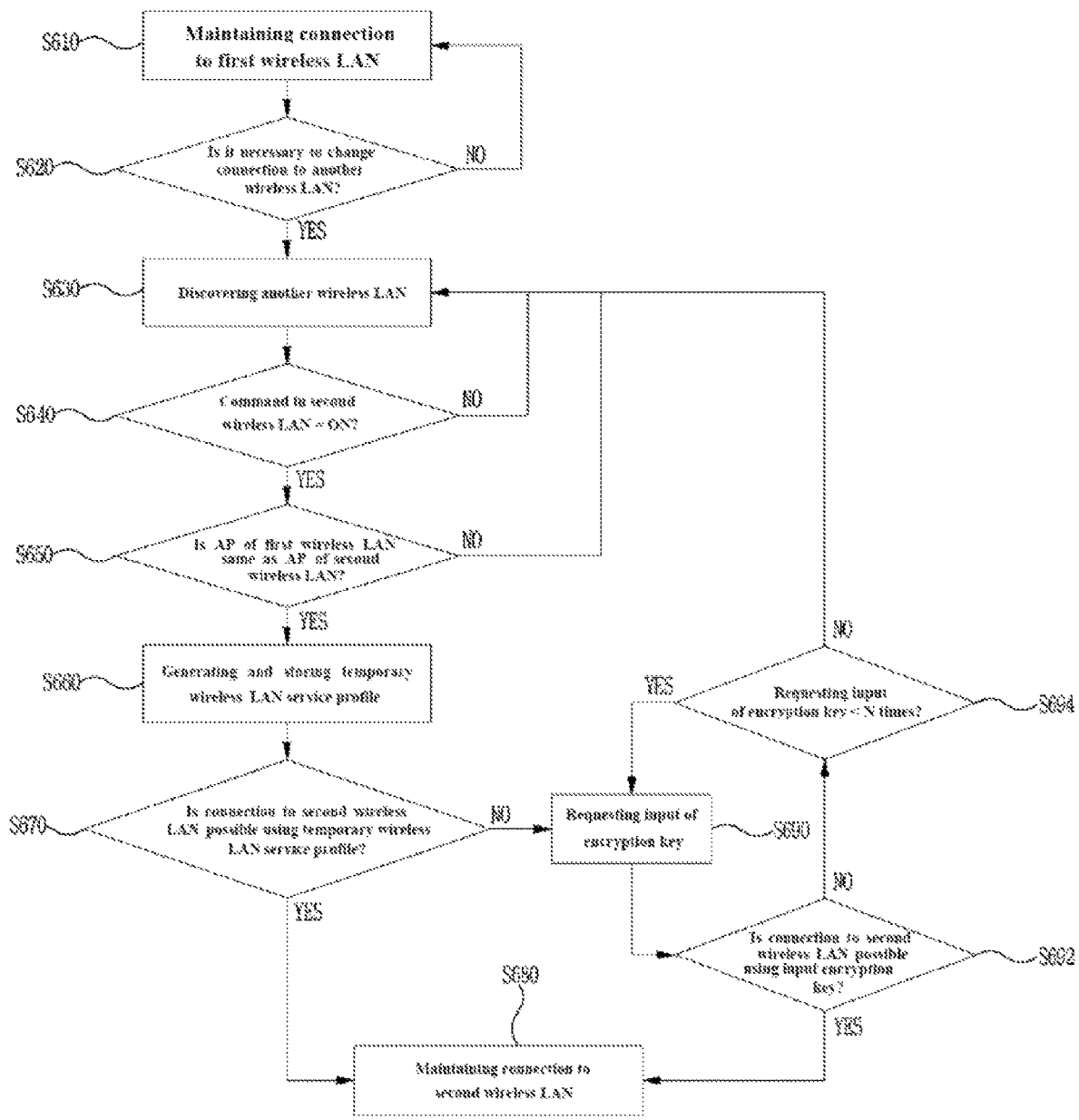
FIG. 6 is a flowchart illustrating a dynamic connection method by a terminal according to the present invention.

FIG. 6 is a flowchart illustrating a dynamic connection method by a terminal according to the present invention.

At step S610, the terminal is in a state where access to the first wireless LAN is maintained. That is, the terminal stores the first wireless LAN service profile for the first wireless LAN that is identified by the first SSID and operates on the first frequency band.

At step S620, the terminal determines whether it is necessary to change the connection to another wireless LAN. For example, the terminal may determine whether delay or disconnection of the service occurs or not due to degradation of the service quality, degradation of rate, degradation of signal strength, increase in interference size, and the like on the first wireless LAN.

At step S630, the terminal may discover another wireless LAN other than the first wireless LAN. The discovery of another wireless LAN may include receiving the management frame such as, the beacon frame, the probe response frame, and the like, which is transmitted on another wireless LAN other than the first wireless LAN, overhearing the control frame, the data frame, the management frame, and the like, which is transmitted to another terminal on another wireless LAN, or receiving the GAS frame, and the like, which is transmitted on another wireless LAN. Accordingly, the terminal may check the AP identity determination information (for example, at least one among the OUI, the OUI type, and the AP type) and the command information (namely, information indicating whether a dynamic change of the connection is allowed) that are contained in the frame transmitted on another wireless LAN.

At step S640, the terminal may check the value of the command information contained in the frame that is transmitted on the wireless LAN (for example, the second wireless LAN) discovered at step S630. When the value of the command information indicates ON (namely, when the dynamic change of the connection is allowed), proceeding to step S650 takes place. Otherwise, returning back to step S630 and discovery of another wireless LAN other than the second wireless LAN take place.

At step S650, the terminal may determine whether the AP on the first wireless LAN is the same as the AP on the second wireless LAN. For example, the terminal may compare at least one among the first OUI value, the first OUI type value, and the first AP type value that are contained in the frame transmitted on the first wireless LAN with at least one among the second OUI value, the second OUI type value, and the second AP type value that are contained in the frame transmitted on the second wireless LAN. Since the detailed determination method is the same as the above-described embodiments of the present invention, a repeated description will be omitted.

When determining that the AP on the first wireless LAN is the same as the AP on the second wireless LAN, proceeding to step S660 takes place. Otherwise, returning back to step S630 and discovery of another wireless LAN other than the second wireless LAN take place.

At step S660, the terminal may generate and store, on the basis of the first wireless LAN service profile, the temporary wireless LAN service profile for connection to the second wireless LAN. For example, information on the encryption method, the encryption key, and the like in the first wireless LAN service profile is intactly used to generate and store the temporary wireless LAN service profile.

At step S670, the terminal may determine whether connection to the second wireless LAN is possible using the temporary wireless LAN service profile stored at step S660. When connection to the second wireless LAN is possible, proceeding to step S680 takes place and access to the second wireless LAN is maintained. Otherwise, proceeding to step S690 takes place.

At step S690, the terminal may request the user to input the encryption key. That is, when connection to the second wireless LAN is impossible using the temporary wireless LAN service profile generated on the basis of the first wireless LAN service profile, the user is requested to input the encryption key for connection to the second wireless LAN.

At step S692, the terminal may determine whether connection to the second wireless LAN is possible using the encryption key input by the user. When connection to the second wireless LAN is possible, proceeding to step S680 takes place and access to the second wireless LAN is maintained. Otherwise, proceeding to step S694 takes place.

At step S694, the terminal may determine whether the number of times that input of the encryption key is requested is less than N times. When the number of times that input of the encryption key is requested is less than N times, retuning back to step S690 takes place and the user is requested to input the encryption key again. When the number of times that input of the encryption key is requested is equal to or greater than N times, retuning back to step S630 and discovery of another wireless LAN other than the second wireless LAN take place.

In the above-described various embodiments, when the first SSID is the same as the second SSID, or when a portion of the first SSID is the same as a portion of the second SSID, the method of dynamically changing the connection of the present invention is applied. For example, at step S640 in FIG. 6, before checking the command value on the second wireless LAN, whether the second SSID on the second wireless LAN is the same as or similar to the first SSID on the first wireless LAN to which the terminal currently is connected is determined. When the first SSID is the same as or similar to the second SSID, whether the command value on the second wireless LAN is ON or not is determined. When the first SSID is not the same as and not similar to the second SSID, returning back to step S630 and discovery of another wireless LAN other than the second wireless LAN take place.

The terminal that performs the operation of dynamically changing the connection as described above may be configured as the terminal apparatus 100 shown in FIG. 1.

For example, the processor 110 may determine whether it is necessary for the terminal apparatus 100 connected to the first wireless LAN to change the connection to another wireless LAN. Also, the processor 110 may compare first AP identity determination information that is received on the first wireless LAN via the transceiver 130 with second AP identity determination information that is received on the second wireless LAN via the transceiver 130 so as to determine whether the AP on the first wireless LAN is the same as the AP on the second wireless LAN. Also, when determining that the AP on the first wireless LAN is the same as the AP on the second wireless LAN, the processor 110 generates, on the basis of the wireless LAN service profile for the first wireless LAN, the temporary wireless LAN service profile and transmits, using the generated temporary wireless LAN service profile, the message for requesting connection to the second wireless LAN to the second wireless LAN via the transceiver 130.

The AP that supports the operation of dynamically changing the connection of the terminal as described above may be configured as the AP apparatus 200 shown in FIG. 1.

For example, the processor 210 may transmit the first AP identity determination information for the first wireless LAN provided by the AP apparatus 200 to the terminal apparatus 100 via the transceiver 230. Also, the processor 210 may transmit the second AP identity determination information for the second wireless LAN provided by the AP apparatus 2000 to the terminal apparatus 100 via the transceiver 230. Also, the processor 210 may receive the request for connection, which uses the temporary wireless LAN service profile generated by the terminal apparatus 100 on the basis of the first wireless LAN service profile for the first wireless, from the terminal apparatus 100 via the transceiver 230. Also, when the temporary wireless LAN service profile matches the wireless LAN service profile for the second wireless LAN, the processor 210 transmits, to the terminal 100 via the transceiver 230, the message for allowing the connection requested by the terminal apparatus 100.

The matters described in the various embodiments of the present invention may be applied independently, or two or more embodiments may be simultaneously applied.

Although the exemplary methods described in the various embodiments of the present invention are expressed as a series of operations for clarity of description, the order of the steps is not limited thereto. When necessary, the steps may be performed simultaneously or in a different order. Further, not all exemplary steps are necessary to realize the method proposed in the present invention.

The scope of the present invention includes the apparatus for processing or realizing operation according to the method proposed in the present invention.

The scope of the present invention includes software (or an operating system, an application, firmware, a program, or the like) that cause operation according to the method proposed in the present invention to be performed on a device or a computer, and includes a medium storing such software, or the like to execute on a device or a computer.

The invention claimed is:

1. A method of dynamically changing a connection by a terminal in a wireless local area network (LAN), the method comprising:
    determining, by the terminal connected to a first wireless LAN, a change of the connection to another wireless LAN;
    receiving command information that indicates whether a dynamic change of the connection to a second wireless LAN is allowed from the second wireless LAN;
    determining whether an access point (AP) of the first wireless LAN is the same as an AP of the second wireless LAN by comparing first AP identity determination information received from the first wireless LAN with second AP identity determination information received from the second wireless LAN when the received command information indicates that the dynamic change of the connection to the second wireless LAN is allowed; and
    transmitting, to the second wireless LAN, a message for requesting the connection to the second wireless LAN by using a temporary wireless LAN service profile generated on the basis of a wireless LAN service profile for the first wireless LAN, when the AP of the first wireless LAN is the same as the AP of the second wireless LAN.

2. The method of claim 1, wherein at least one among the first AP identity determination information and the second AP identity determination information comprises at least one among organizationally unique identifier (OUI) information, OUI type information, and AP type information.

3. The method of claim 1, wherein at least one among the first AP identity determination information and the second AP identity determination information comprises an OUI portion of a basic service set identifier (BSSID).

4. The method of claim 1, wherein at least one among the first AP identity determination information and the second AP identity determination information is configured to be included in at least one among a beacon frame and a probe response frame.

5. The method of claim 1, wherein the temporary wireless LAN service profile is stored in the terminal for a predetermined time period.

6. The method of claim 1, wherein the temporary wireless LAN service profile is generated using information including an encryption method and an encryption key for the first wireless LAN, which are included in the wireless LAN service profile for the first wireless LAN.

7. The method of claim 6, wherein the encryption method and the encryption key for the first wireless LAN are set to be the same as an encryption method and an encryption key for the second wireless LAN.

8. The method of claim 1, wherein the first wireless LAN operates in a first frequency band and the second wireless LAN operates in a second frequency band.

9. The method of claim 1, wherein the first wireless LAN is identified by a first service set identifier (SSID) and the second wireless LAN is identified by a second SSID.

10. A terminal apparatus for performing a dynamic change of a connection in a wireless local area network (LAN), the terminal apparatus comprising:
    a transceiver;
    a processor; and
    a memory,
    wherein the processor is configured to:
    determine the change of the connection to another wireless LAN when the terminal apparatus is connected to a first wireless LAN;
    receive command information that indicates whether a dynamic change of the connection to a second wireless LAN is allowed from the second wireless LAN;
    determine whether an access point (AP) of the first wireless LAN is the same as an AP of the second wireless LAN by comparing first AP identity determination information received from the first wireless LAN via the transceiver with second AP identity determination information received from the second wireless LAN via the transceiver when the received command information indicates that the dynamic change of the connection to another wireless LAN is allowed; and
    transmit, to the second wireless LAN via the transceiver, a message for requesting the connection to the second wireless LAN by using a temporary wireless LAN service profile generated on the basis of a wireless LAN service profile for the first wireless LAN, when the AP of the first wireless LAN is the same as the AP of the second wireless LAN.

* * * * *